(12) United States Patent
Ungrady et al.

(10) Patent No.: US 7,832,583 B2
(45) Date of Patent: Nov. 16, 2010

(54) HOT-FILLABLE CONTAINER AND METHOD OF MAKING

(75) Inventors: Eric B. Ungrady, Mt. Wolf, PA (US); Sheldon E. Yourist, York, PA (US)

(73) Assignee: Graham Packaging Company, L.P., York, PA (US)

( * ) Notice: Subject to any disclaimer, the term of this patent is extended or adjusted under 35 U.S.C. 154(b) by 311 days.

(21) Appl. No.: 11/872,865

(22) Filed: Oct. 16, 2007

(65) Prior Publication Data

US 2009/0095702 A1 Apr. 16, 2009

(51) Int. Cl.
*B65D 1/02* (2006.01)
*B65D 1/46* (2006.01)
*B29C 51/00* (2006.01)

(52) U.S. Cl. .................. 215/383; 215/382; 220/673; 220/675; 264/572

(58) Field of Classification Search .............. 215/381, 215/382, 383, 384; 220/671, 673, 675; 264/572; 141/1
See application file for complete search history.

(56) References Cited

U.S. PATENT DOCUMENTS

| | | | |
|---|---|---|---|
| 4,804,097 A | | 2/1989 | Alberghini et al. |
| 4,877,141 A * | | 10/1989 | Hayashi et al. ............ 215/381 |
| 5,199,588 A * | | 4/1993 | Hayashi ..................... 215/381 |
| 5,704,504 A * | | 1/1998 | Bueno ......................... 215/381 |
| 5,971,184 A * | | 10/1999 | Krishnakumar et al. ..... 215/384 |
| D437,774 S | | 2/2001 | Piccioli et al. |
| D441,659 S | | 5/2001 | Di Canio et al. |
| D444,710 S | | 7/2001 | Zboch et al. |
| D451,811 S | | 12/2001 | Zboch et al. |
| 6,981,604 B2 * | | 1/2006 | Iizuka et al. ............... 215/381 |
| D522,870 S | | 6/2006 | Venkataraman et al. |
| 7,097,059 B2 * | | 8/2006 | Saito et al. ................. 215/383 |
| D531,910 S | | 11/2006 | Melrose |
| D536,255 S | | 2/2007 | Corbett et al. |
| D539,155 S | | 3/2007 | Steinmann |
| 2001/0054597 A1* | | 12/2001 | Ozawa et al. .............. 215/381 |
| 2005/0045645 A1* | | 3/2005 | Tsutsui et al. .............. 220/669 |
| 2005/0067369 A1* | | 3/2005 | Trude ......................... 215/381 |
| 2005/0158495 A1* | | 7/2005 | Nahill ........................ 428/35.7 |
| 2006/0054587 A1* | | 3/2006 | Oguchi et al. .............. 215/381 |
| 2006/0108317 A1* | | 5/2006 | Tanaka et al. .............. 215/382 |
| 2006/0175284 A1* | | 8/2006 | Noll et al. .................. 215/382 |
| 2007/0075031 A1* | | 4/2007 | Tanaka et al. .............. 215/382 |

* cited by examiner

*Primary Examiner*—Sue A Weaver
(74) *Attorney, Agent, or Firm*—Knoble Yoshida & Dunleavy, LLC (57) ABSTRACT

A hot-fillable container that has an aesthetically pleasing shaped after the hot-fill process. The side walls of the container have structural aspects that permit the side walls to retain a substantially similar shape after the hot-fill process. This allows for an aesthetically pleasing design that compensates for the deformation that can occur during the hot-fill process.

10 Claims, 13 Drawing Sheets

HOT-FILLABLE CONTAINER AND METHOD OF MAKING

BACKGROUND OF THE INVENTION

1. Field of the Invention

The invention relates to the field of container. In particular, the invention relates to a hot-fillable container and method of making.

2. Description of the Related Technology

In the past, containers used for the storage of products, such as beverages, were made of glass. Glass was used due to its transparency, its ability to maintain its structure and the ease of affixing labels to it. However, glass is fragile and heavy. This results in lost profits due to broken containers during shipping and storage caused by the usage of glass and additional costs due to the transportation of heavier materials.

Plastic containers are used more frequently today due to their durability and lightweight nature. Polyethylene terephthalate (PET) is used to construct many of today's containers. PET containers are lightweight, inexpensive, recyclable and manufacturable in large quantities.

PET containers are used for products, such as beverages. Often these liquid products, such as juices and isotonics, are filled into the containers while the liquid product is at an elevated temperature, typically between 68° C.-96° C. (155° F.-205° F.) and usually about 85° C. (185° F.). When packaged in this manner, the hot temperature of the liquid is used to sterilize the container at the time of filling. This process is known as hot-filling. The containers that are designed to withstand the process are known as hot-fill containers.

The use of blow molded plastic containers for packaging hot-fill beverages is well known. However, a container that is used in the hot-fill process is subject to additional stresses on the container that can result in the container failing during storage or handling or to be deformed in some manner. The sidewalls of the container can become deformed and/or collapse as the container is being filled with hot fluids. The rigidity of the container can decrease after the hot-fill liquid is introduced into the container.

After being hot-filled, the hot-filled containers are capped and allowed to reside at about the filling temperature for a predetermined amount of time. The containers and stored liquid may then be cooled so that the containers may be transferred to labeling, packaging and shipping operations. As the liquid stored in the container cools, thermal contraction occurs resulting in a reduction of volume. This results in the volume of liquid stored in the container being reduced. The reduction of liquid within the sealed container results in the creation of a negative pressure or vacuum within the container. If not controlled or otherwise accommodated for, these negative pressures result in deformation of the container which leads to either an aesthetically unacceptable container or one which is unstable. The container must be able to withstand such changes in pressure without failure.

The negative pressure within the container has typically been compensated for by the incorporation of flex panels in the sidewall of the container. Traditionally, these paneled areas have been semi-rigid by design and are unable to accommodate the high levels of negative pressure generated in some lightweight containers. Currently, hot-fill containers typically include substantially rectangular vacuum panels that are designed to collapse inwardly after the container has been filled with hot product. These flex panels are designed so that as the liquid cools, the flex panels will deform and move inwardly. The adjacent portions of the container, such as the so-called lands, or columns, which are located between, above, and below the flex panels, are intended to resist any deformations which would otherwise be caused by hot-fill processing. Wall thickness variations, or geometric structures, such as ribs, projections and the like, can be utilized to prevent unwanted distortion. Generally, the typical hot-fillable container structure is provided with certain pre-defined areas which flex to accommodate volumetric changes and certain other pre-defined areas which remain unchanged.

While successful, the inward flexing of the rectangular panels caused by the hot-fill vacuum creates high stress points at the top and bottom edges of the pressure panels, especially at the upper and lower corners of the panels. These stress points weaken the portions of the sidewall near the edges of the panels, allowing the sidewall to collapse inwardly during handling of the container or when containers are stacked together.

An example of a hot-fillable container having a plurality of flex-panels is illustrated in U.S. Design Pat. No. D.366,416 which is owned by the assignee of the present application. The hot-fill bottle has well-defined flex panels which are distinctly visually apparent prior to filling and which accommodate vacuum induced distortions after filling, capping and cooling. The container also has other geometric structures which are completely segregated from the flex panels, which are distinctly visually apparent prior to filling, and which resist structural change caused by volume reduction. Typically, all of these structures are framed about their entire peripheries and are completely separated from the bottle's aesthetic features which are usually limited to the dome of the container. For example, flex panels are often indented from adjacent vertically disposed lands and from circumferential upper and lower label mount regions. Conventionally, the indented panels merge into the adjacent lands via various stepped-shaped walls, grooves, projections or like structures.

Other examples of container sidewalls having flexible panels are disclosed in U.S. Pat. No. 4,749,092 issued to Sugiura et al.; U.S. Pat. No. 3,923,178 issued to Welker III; U.S. Pat. No. 4,497,855 issued to Agrawal et al.; U.S. Pat. No. 5,740,934 issued to Brady; and U.S. Pat. No. 5,704,504 issued to Bueno. The Sugiura, Welker and Agrawal patents disclose inwardly deflecting vacuum flex panels which are located between substantially planar lands; the Bueno patent discloses inwardly deflecting panels which are located between spiral-shaped grooves; and the Brady patent discloses outwardly deflecting panels which intersect at vertically disposed corners.

Although the above referenced containers may function satisfactorily for their intended purposes, there is a need for a hot-fillable blow molded container which integrates functional and aesthetic components in such a manner as to provide a package having enhanced visual interest. Such a package is particularly desirable in single-serve sizes wherein slenderness and the ability to grasp the container with a single-hand are desirable features.

SUMMARY OF THE INVENTION

An object of the invention can be the forming of a hot-fillable container having firm side walls after being hot-filled.

Another object of the invention can be a hot-fillable container having an aesthetically appealing shape after being hot-filled.

Still yet another object of the invention can be a hot-fillable container that reduces the amount of deformation that occurs from being hot-filled.

Another object of the invention can be a method of making a hot-filled container that reduces the amount of deformation that occurs during the hot-fill process.

An aspect of the invention can be a hot-fillable container for use with liquids comprising: a top portion integrally formed with a body portion; the body portion comprising a first planar wall and a second planar wall, wherein the body portion is integrally formed with a bottom portion; wherein the first planar wall comprises at least a first rib extending from a position proximate to the top portion to a position proximate to the bottom portion, the first planar wall further comprising a plurality of second ribs formed therein; and wherein the second planar wall comprises at least a third rib extending from a position proximate to the top portion to a position proximate to the bottom portion, the second planar wall further comprising an arcuate recessed portion formed therein.

Another aspect of the invention can be a method of forming a hot-fill container filled with a liquid comprising: providing a plastic pre-form; processing the plastic pre-form to form a container having a top portion, a bottom portion and a body portion, wherein the body portion has a first planar wall and a second planar wall and the second planar wall is adapted to isolate deformation from hot-filling to the first wall; hot-filling the container with a liquid, wherein hot-filling the container deforms said first planar wall and the second planar wall remains substantially non-deformed.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
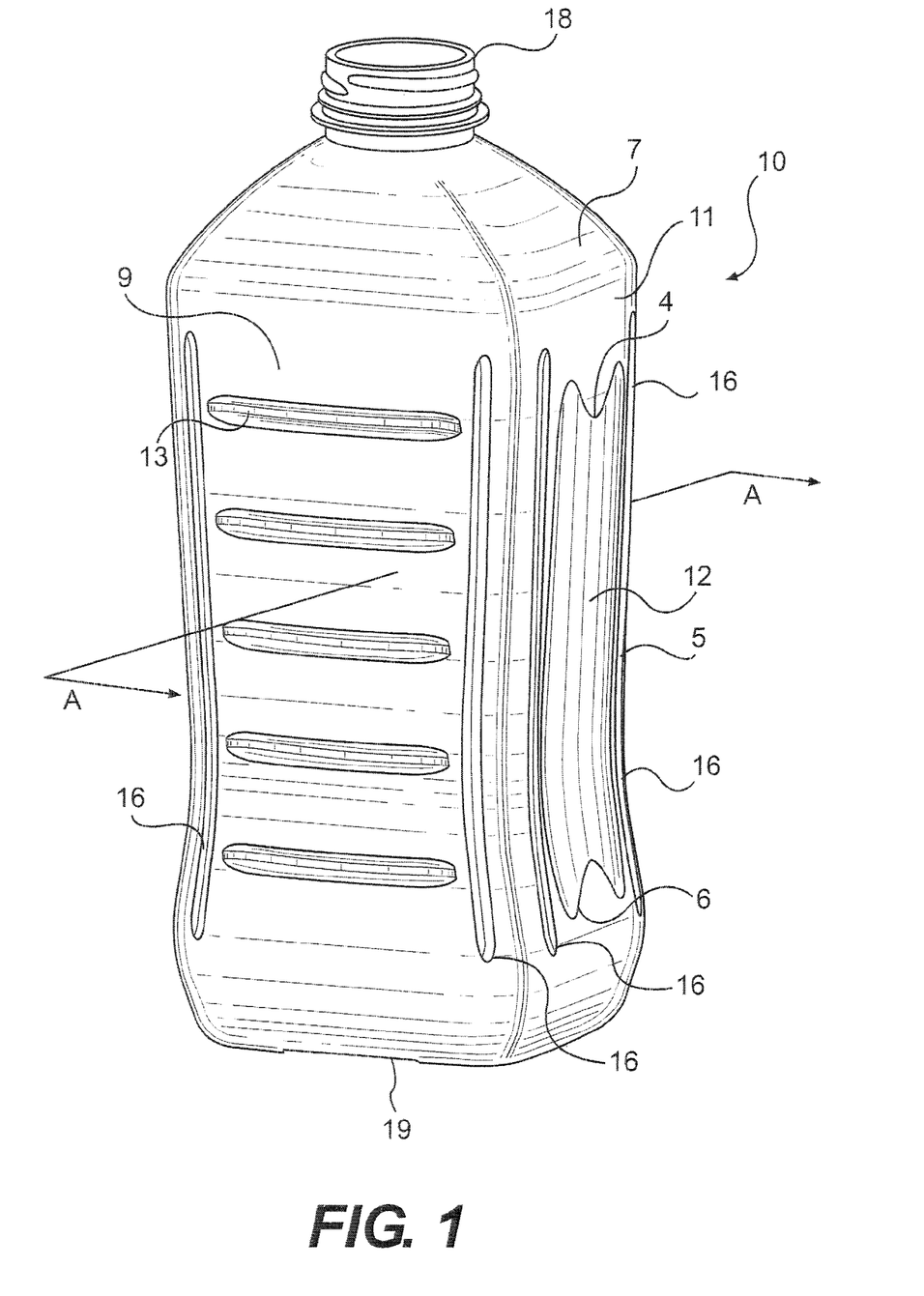
FIG. 1 shows an isometric view of a container in accordance with an embodiment of the present invention.

Referring now to the drawings, wherein like reference numerals designate corresponding structure throughout the views. FIG. 1, wherein an embodiment of the present invention is shown, shows a hot-fill container 10 in its finished form prior to the hot-fill process. The hot-fill container 10 may be used to package a wide variety of liquid and/or viscous products such as juices, a variety of beverages, and other fluids that are amenable to the hot-fill process.

The container 10 may have a one-piece construction and may be prepared from a monolayer plastic material, such as a polyamide, for example, nylon; a polyolefin such as polyethylene, for example, low density polyethylene (LDPE) or high density polyethylene (HDPE), or polypropylene; a polyester, for example polyethylene terephthalate (PET), polyethylene naphtalate (PEN); or others, which may also include additives to vary the physical or chemical properties of the material. For example, some plastic resins may be modified to improve the oxygen permeability. Alternatively, the container may be prepared from a multilayer plastic material. The layers may be any plastic material, including virgin, recycled and reground material, and may include plastics or other materials with additives to improve physical properties of the container. In addition to the above-mentioned materials, other materials often used in multilayer plastic containers include, for example, ethylvinyl alcohol (EVOH) and tie layers or binders to hold together materials that are subject to delamination when used in adjacent layers. A coating may be applied over the monolayer or multilayer material, for example to introduce oxygen barrier properties. In an exemplary embodiment, the present container is prepared from PET.

Figure 11A:
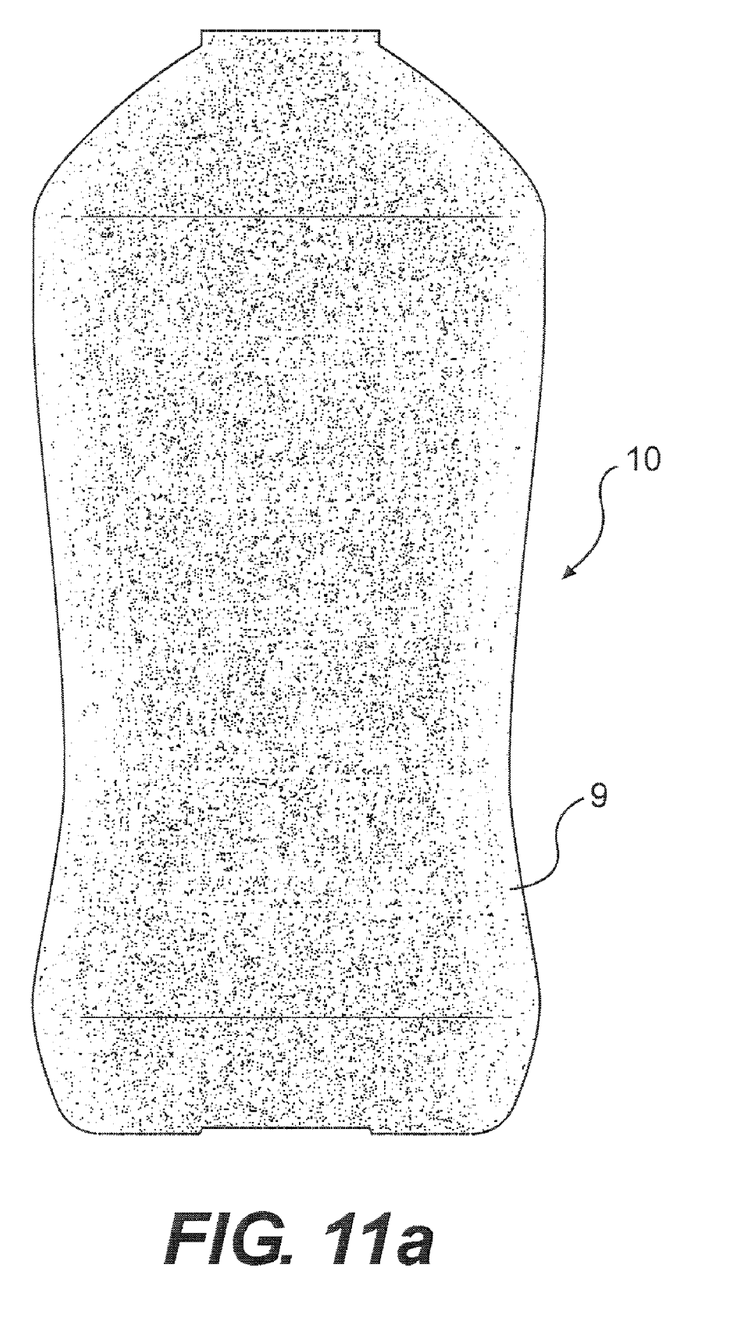
FIGS. 11a-11b show views of the front of the container before and after the hot-fill process.
Figure 11B:
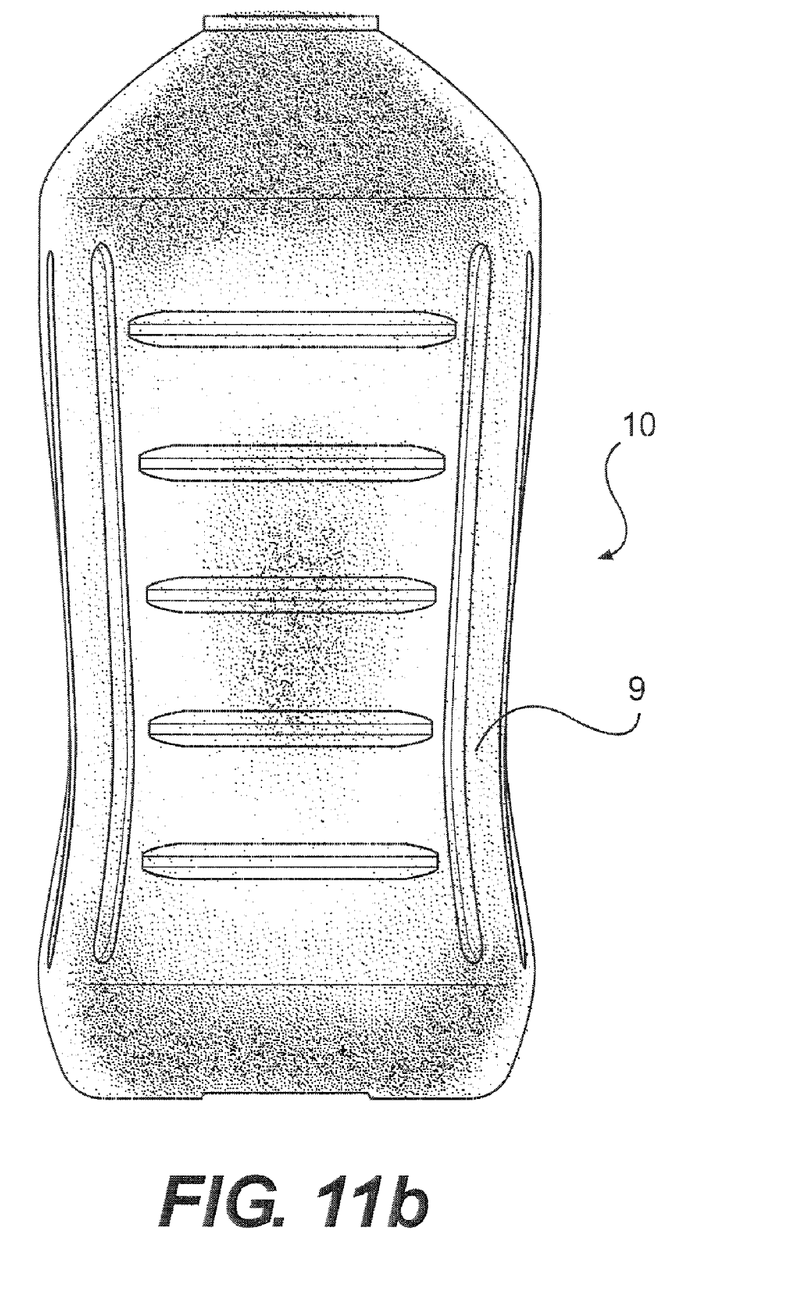
Figure 12A:
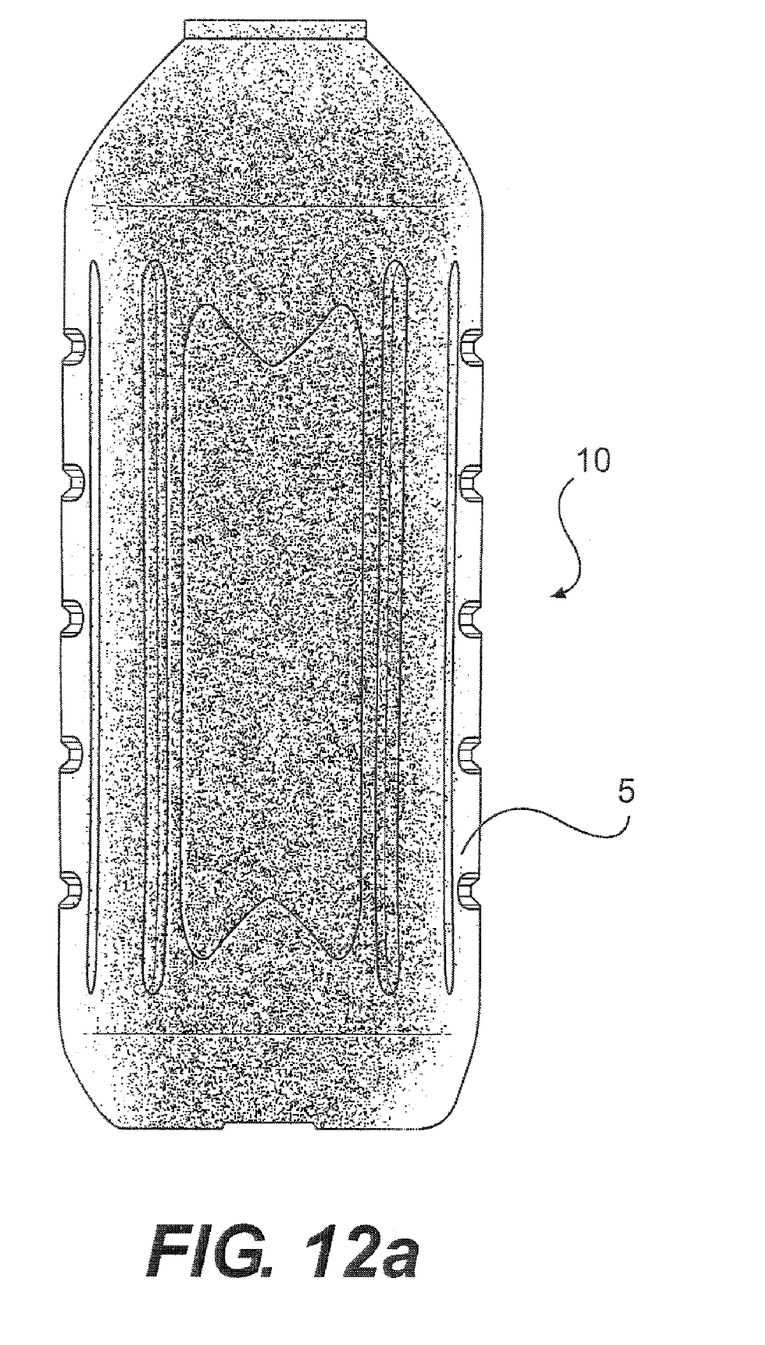
FIGS. 12a-12b shows views of the side of the container before and after the hot-fill process.
Figure 12B:
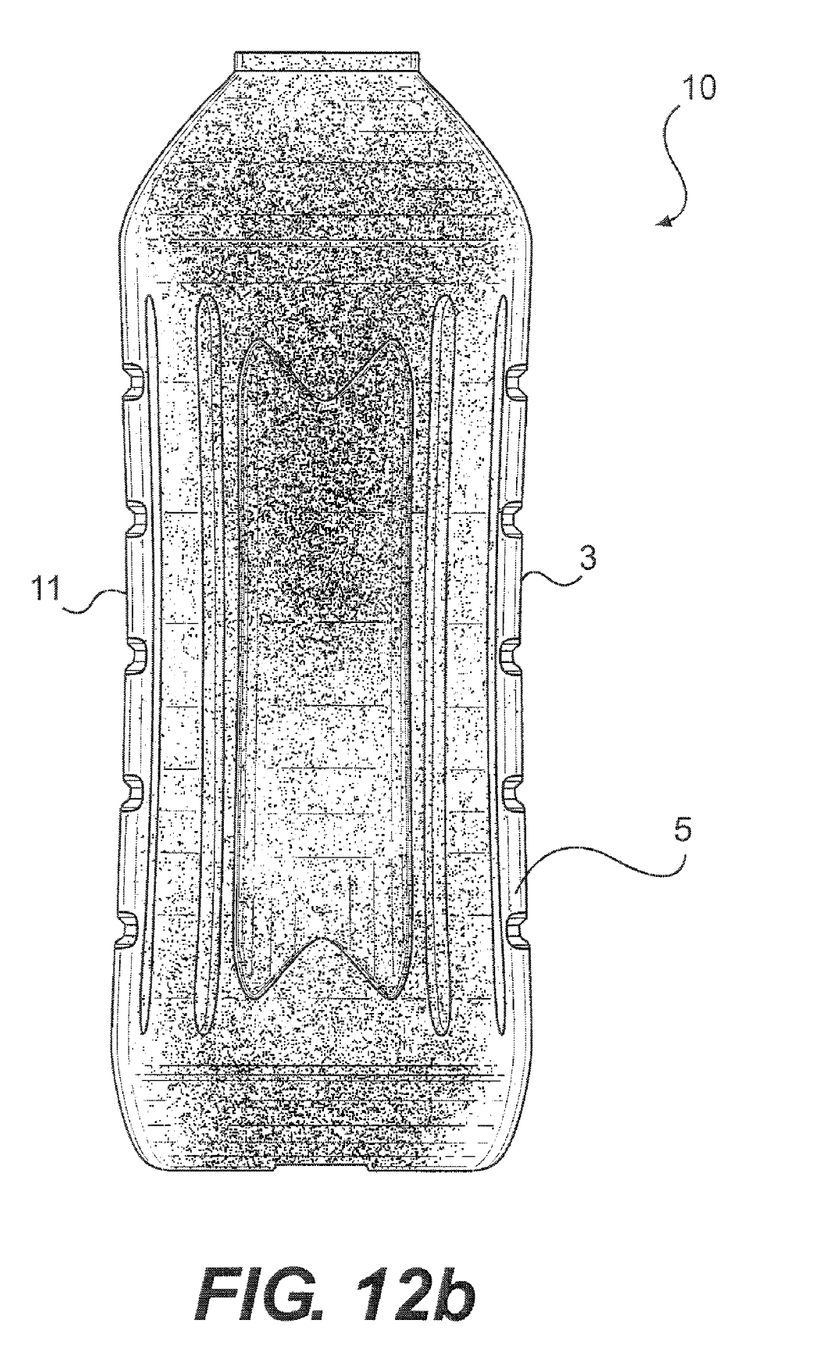

The container 10 is constructed to withstand the rigors of hot-fill processing. FIGS. 11a-11b and 12a-12b illustrate the container 10 before the hot-fill process and after the hot-fill process. The container 10 before the hot-fill process can be seen from the front and the side in FIGS. 11a and 12a. The lighter areas shown in FIGS. 11b and 12b represent where the most deformation due to the hot-fill process occurs. It should be understood that deformation can occur throughout the body to varying degrees; however the structure of the container isolates the deformation that does occur. As can be seen from FIGS. 11a and 12b the front wall 9 has more deformation than the side wall 5 as a result of the hot-fill process. In the hot-fill process, a liquid is added to the container 10 at an elevated temperature, for example about 82° C., which may be near the glass transition temperature of the plastic material, and the container 10 is capped. After filling the container 10, its contents cool. The cooling tends to cause the contents to contract and this volumetric change creates a partial vacuum within the container 10. In the absence of some means for accommodating these internal volumetric and barometric changes, the containers 10 tend to deform and/or collapse. For example, a round container may undergo ovalization, or tend to distort and become out of round. FIGS. 11a-12b illustrate how the structure of the container 10 isolates movement from the side walls 5 so that it primarily focused on the front walls 9. FIG. 12b shows how the front wall 9 and the rear wall 3 are oriented towards the center of the container 10 after the hot-fill process, this is illustrated by the slightly bowed sides of side wall 5. Containers of other shapes may become similarly distorted.

Container 10 may be made by conventional blow molding processes including, for example, extrusion blow molding, stretch blow molding and injection blow molding. These molding processes are discussed briefly below.

For example, with extrusion blow molding, a molten tube of thermoplastic material, or plastic parison, is extruded between a pair of open blow mold halves. The blow mold halves close about the parison and cooperate to provide a cavity into which the parison is blown to form the container. As so formed, container 10 may include extra material, or flash, at the region where the molds come together, or extra material, or a moil, intentionally present above the container finish. After the mold halves open, the container 10 drops out and is then sent to a trimmer or cutter where any flash of moil is removed. The finished container 10 may have a visible ridge (not shown) formed where the two mold halves used to form the container came together. This ridge is often referred to as the parting line.

With stretch blow molding, for example, a pre-formed parison, or pre-form, is prepared from a thermoplastic material, typically by an injection molding process. The pre-form typically includes an opened, threaded end, which becomes the threaded member 18 of the container 10. The pre-form is positioned between two open blow mold halves. The blow mold halves close about the pre-form and cooperate to provide a cavity into which the pre-form is blown to form the container. After molding, the mold halves open to release the container 10. For wide mouth containers, the container 10 may then be sent to a trimmer where the moil, or extra plastic material above the blown finish, is removed.

With injection blow molding, a thermoplastic material may be extruded through a rod into an injection mold to form a parison. The parison is then positioned between two open blow mold halves. The blow mold halves close about the parison and cooperate to provide a cavity into which the parison may be blown to form the container 10. After molding, the mold halves open to release the container.

Plastic blow-molded containers, particularly those molded of PET, have been utilized in hot-fill applications where the container 10 is filled with a liquid product heated to a temperature in excess of 180° F. (i.e., 82° C.), capped immediately after filling, and then allowed to cool to ambient temperatures.

Now referring to FIG. 1, wherein an isometric view of the container 10 is shown prior to having the hot-fill process. Container 10 is designed to contain between 1.3 to 1.9 liters of fluid and in the embodiment shown typically made to contain 1.36 liters or 1.89 liters. The container 10 has a top portion 7, a body portion 11 and a bottom portion 19. The body portion 11 is integrally formed with the top portion 7 and the bottom portion 19. The top portion 7 has a threaded member 18 that can receive a cap for sealing the container 10.

The body portion 11 shown in FIG. 1 is substantially rectangular shaped. The body portion 11 has a front wall 9 and side walls 5. Opposite to the front wall 9 is a rear wall 3, shown in FIG. 3, which is similar in construction to the front wall 9. Opposite to the side wall 5 is a matching side wall 5. Together these four walls form the body portion 11.

Figure 2:
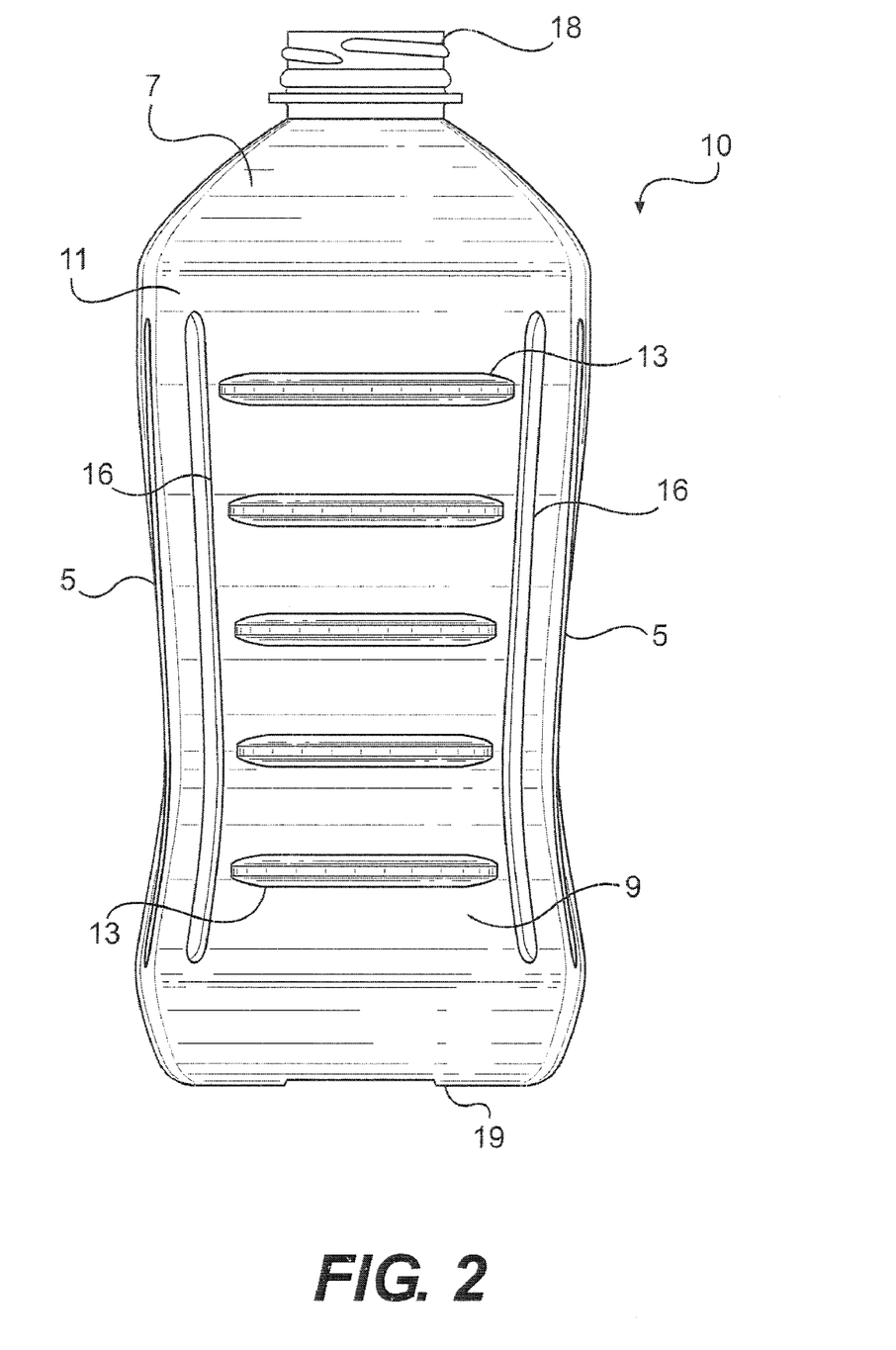
FIG. 2 shows a front view of the container shown in FIG. 1.

Now referring to FIG. 2 wherein the front wall 9 is shown in detail. The front wall 9 has a generally flat planar surface that has a slight inward curvature where the body portion 11 meets the bottom portion 19. As used herein, "planar" is defined as a substantially or generally flat surface, with slight curvature of the surface permitted. Recessed within the planar surface are two ribs 16 that extend longitudinally from a position proximate to the bottom portion 19 to a position proximate to the top portion 7. The longitudinal ribs 16 are also positioned proximate to where the front wall 9 joins the side walls 5. The ribs 16 strengthen the structure of the front wall 9 at the corners of the container 10. The ribs 16 also help prevent deformation of the body portion 11 that can occur during the hot fill process.

Perpendicular to the ribs 16 and running transversely across the front wall 9 are ribs 13. In FIG. 2, more than one rib 13 is shown, however it should be understood that more or less ribs 13 can be used depending the structural requirements of the container 10 and the aesthetic needs. The ribs 13 are recessed within the flat planar surface and are parallel with respect to each other. The ribs 13 together with the ribs 16 operate together in order to strengthen the integrity of the front wall during the hot-fill process. The ribs 13 may also function as a hand grip along with the ribs 13 that are located on the back wall 3 of the container 10.

Figure 3:
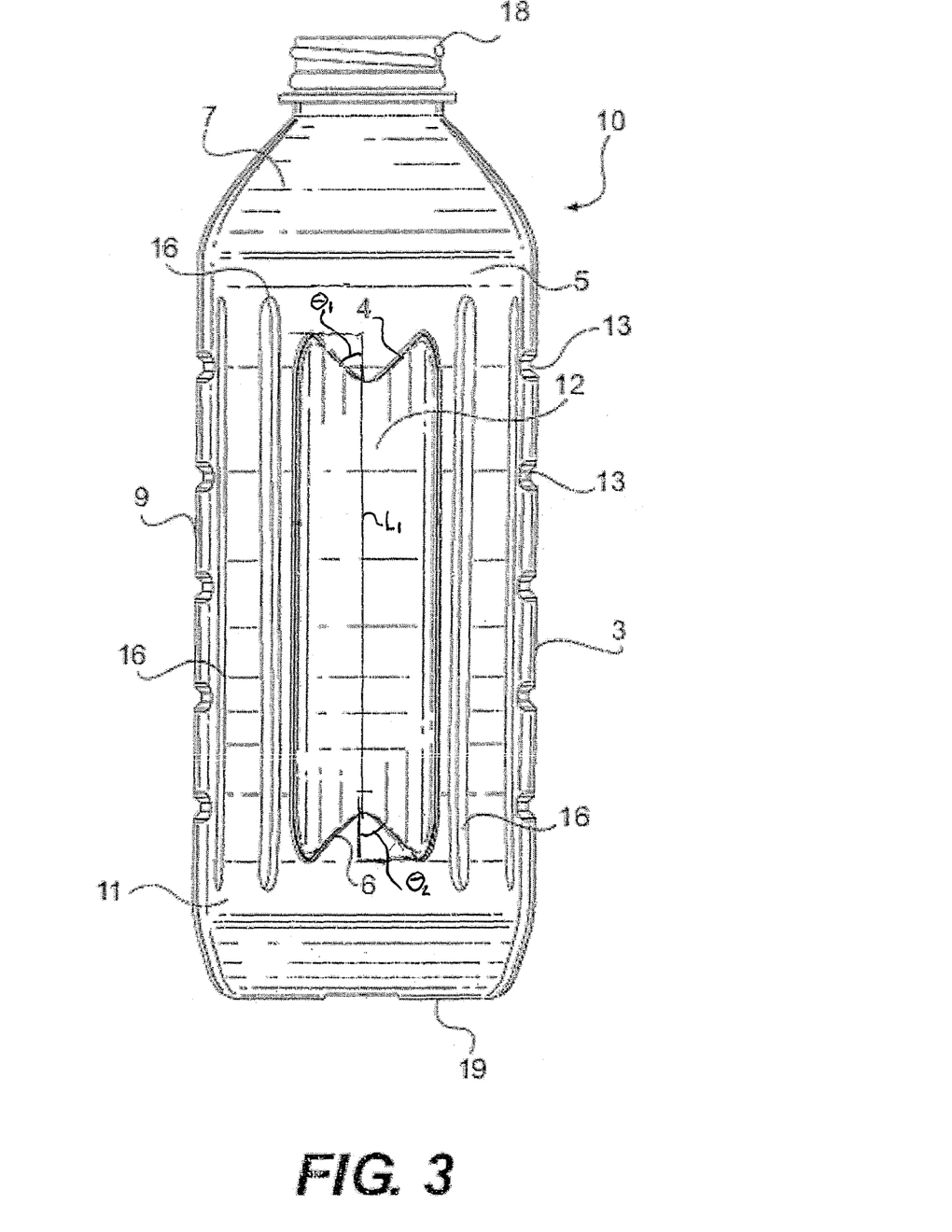
FIG. 3 shows a side view of the container shown in FIG. 1.

FIG. 3 shows the side wall 5 of the container 10 in detail. The side wall 5 has a generally planar surface. Similar to the front wall 9 and the rear wall 3, the side wall 5 has ribs 16 formed therein. The ribs 16 are recessed within the flat planar surface of the side wall 5 and extend longitudinally from a position proximate to the bottom portion 19 to a position proximate to the top portion 7. The longitudinal ribs 16 are also positioned proximate to where the front wall 9 joins the side wall 5 and where the rear wall 3 joins the side wall 5. The ribs 16 strengthen the structure of the front wall 9 and the rear wall 3 at the corners of the container 10. The ribs 16 also assist in preventing deformation of the side wall 5 during the hot-fill process.

Figure 10:
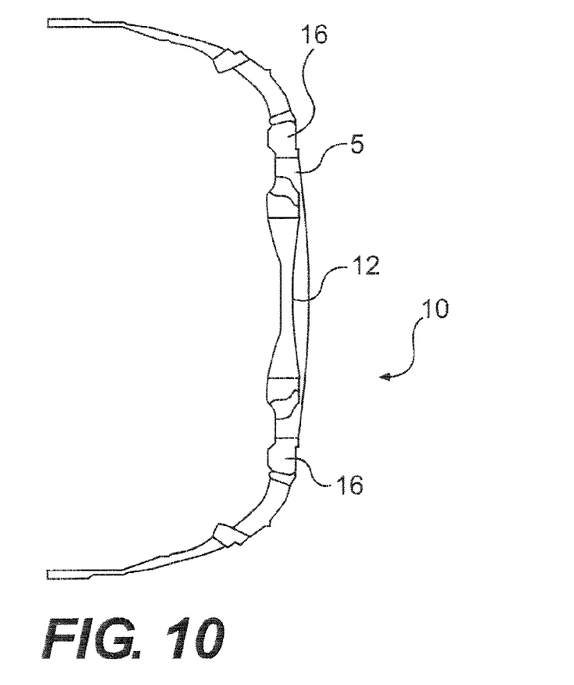
FIG. 10 shows a cross-sectional view of the container shown in FIG. 1 taken along the line A-A.

Running longitudinally and parallel to the ribs 16 is a panel 12. The panel 12 is formed from the structure of the side wall 5. A detailed cross-sectional view of the panel 12 is shown in FIG. 10 discussed below. The panel 12 has a top edge 4 and a bottom edge 6. The top edge 4 and the bottom edge 6 are V shaped, however it should be understood that other shapes may be possible such as U shaped, or irregular shaped. The top edge 4 and the bottom edge 6 are obliquely angled with respect to the center line L1 of the panel 12 by the angles $\theta_1$ and $\theta_2$, respectively. The panel 12 is shaped in this fashion so as to provide additional strength to the side wall 5 in order to prevent deformation of the container 10 during the hot-fill process. This enables the container 10 to have a more aesthetically pleasing shape after the hot-fill process.

Figure 4:
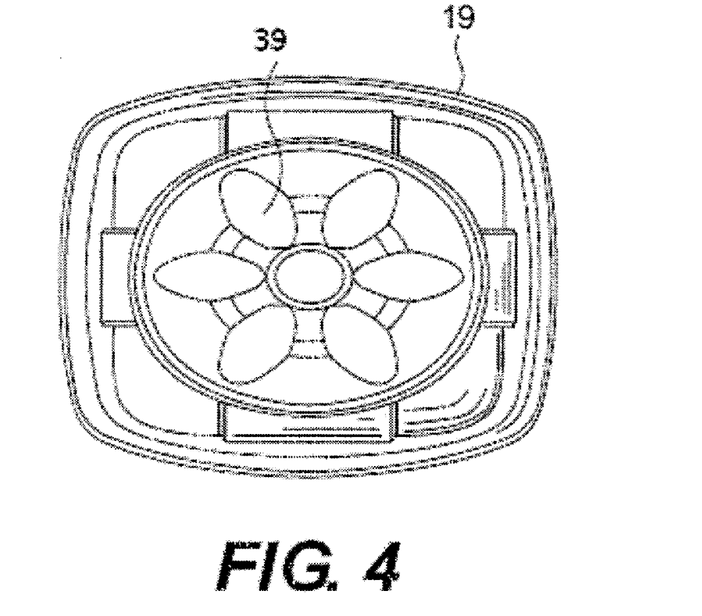
FIG. 4 shows a bottom view of the container shown in FIG. 1.
Figure 5:
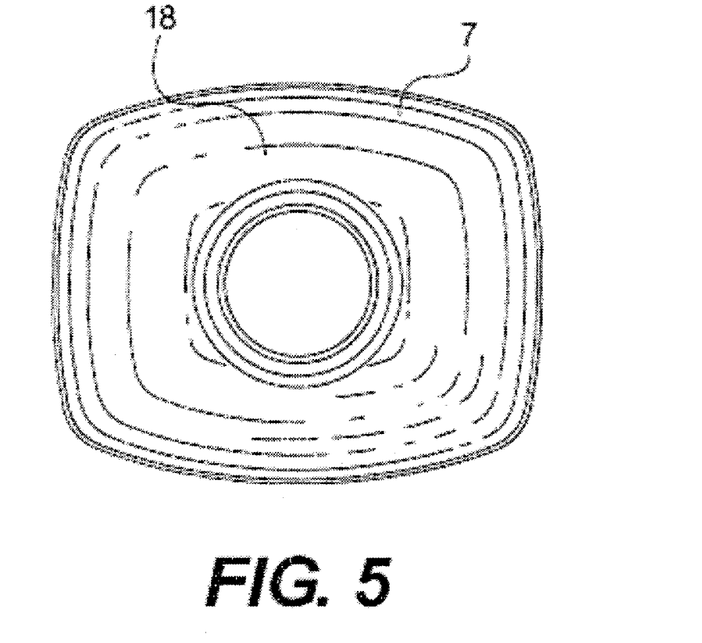
FIG. 5 shows a top view of the container shown in FIG. 1.

FIG. 4 is view of the bottom portion 19 of the container 10. The bottom portion 19 has a plurality of toes 39. The toes 39 additionally help retain the structure of the container 10 during the hot-fill process and further assist in keeping the container 10 in an upright position when used. FIG. 5 is a view of the top portion 7 of the container 10. As shown, the top portion 7 has a circular threaded member 18 that is capable of receiving a cap.

Figure 6:
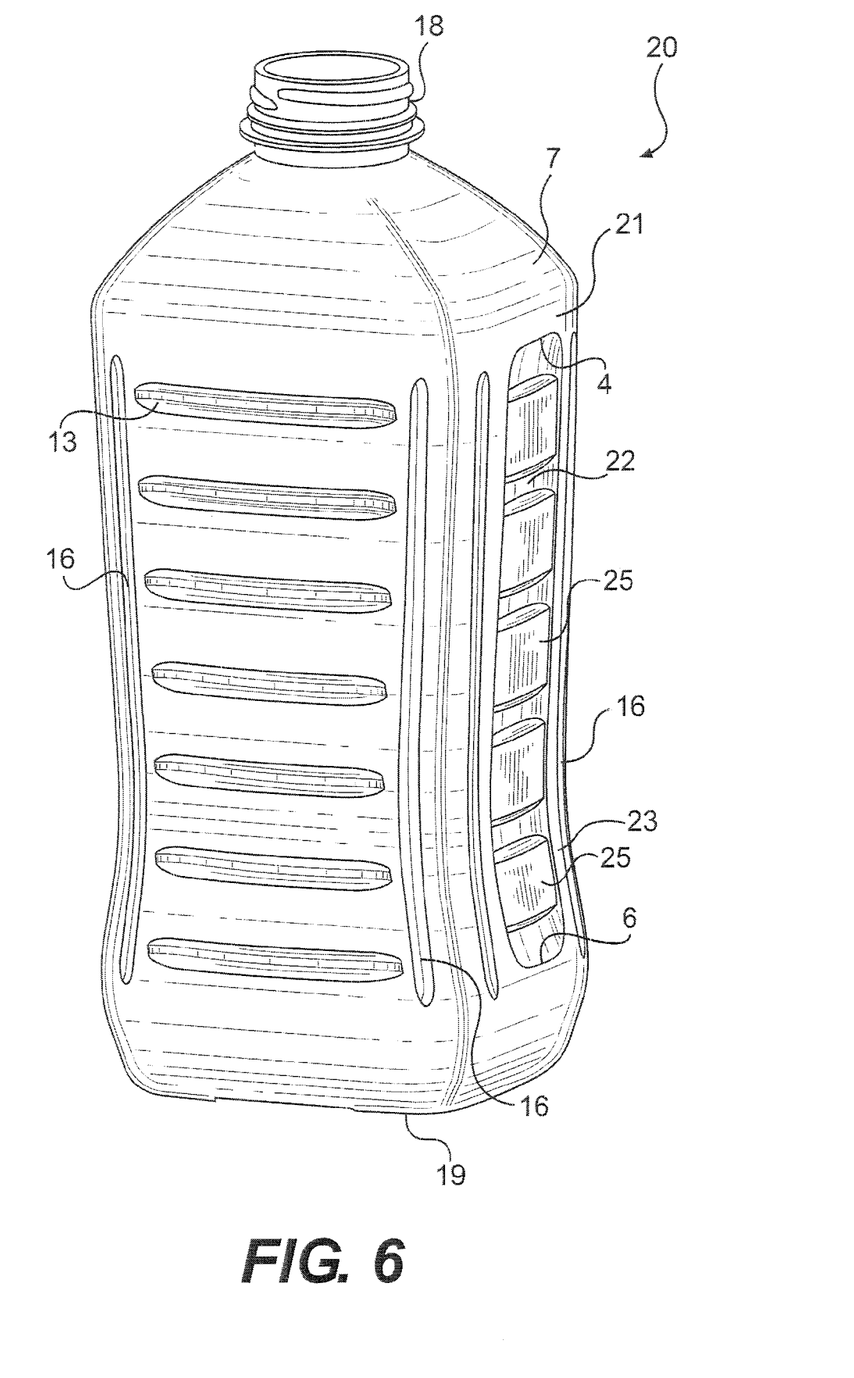
FIG. 6 shows an isometric view of a container in accordance with another embodiment of the present invention.
Figure 7:
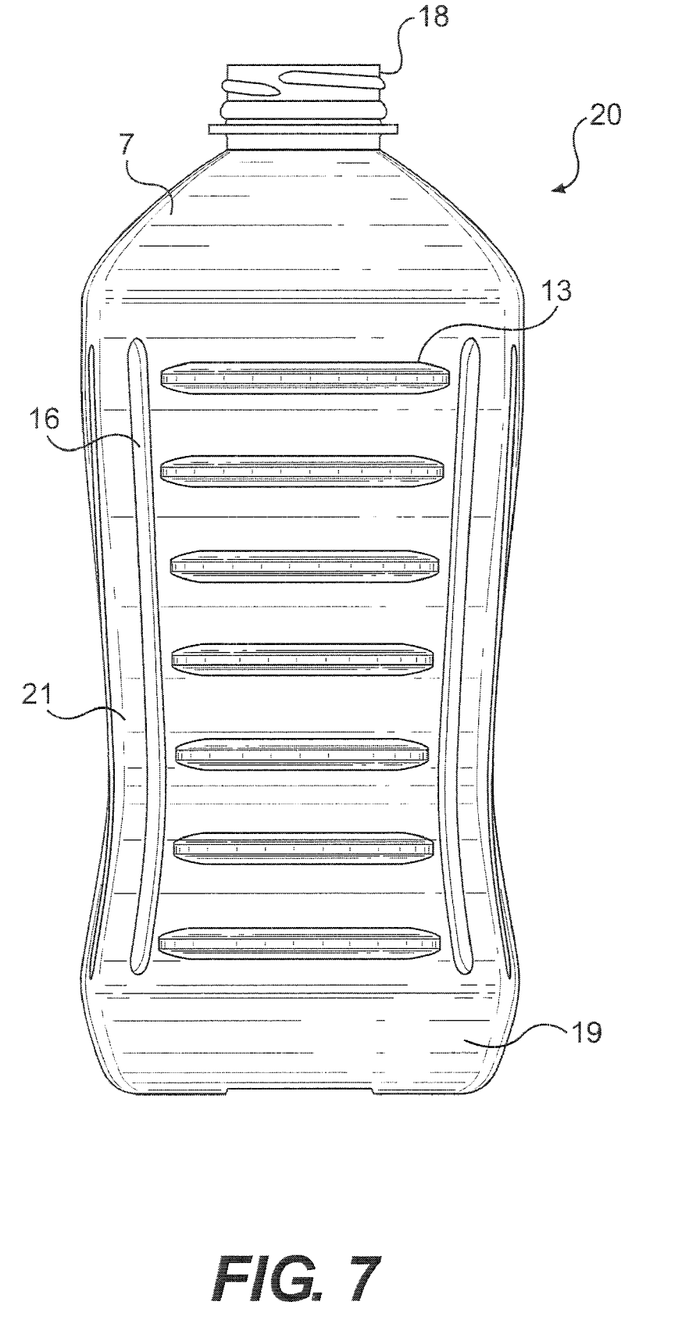
FIG. 7 shows a front view of the container shown in FIG. 6.
Figure 8:
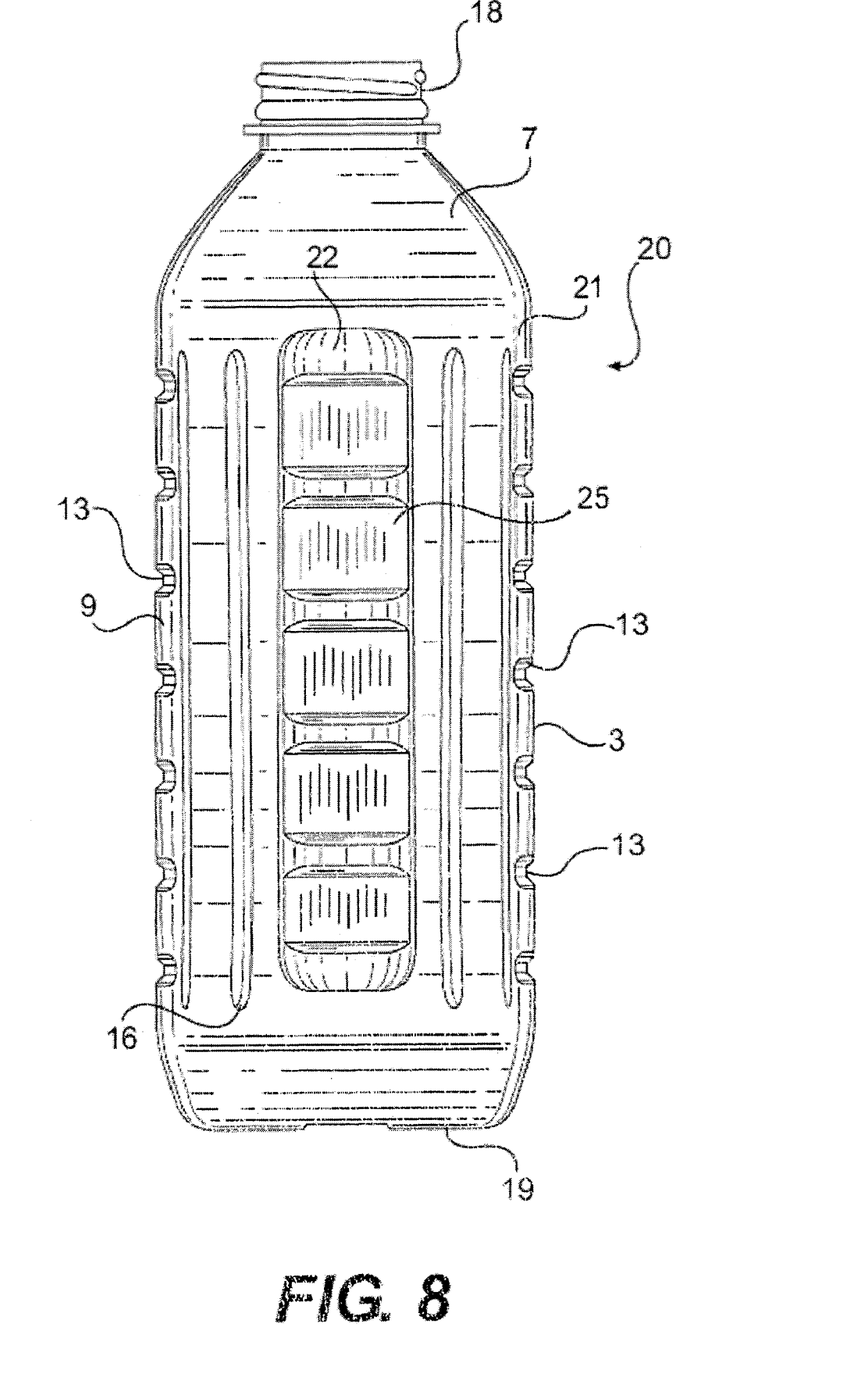
FIG. 8 shows a side view of the container shown in FIG. 6.

In FIGS. 6-8 an alternative embodiment of the present invention is shown. The container 20 has similar structure to the container 10 shown in FIGS. 1-5. The container 20 has a pair of side walls 23 that have a different panel 22 than that of the container 10. The side wall 23 has a substantially flat planar surface. The ribs 16 are recessed within the body portion 21 of the side wall 23. The body portion 21 has a panel 22 that is recessed with respect to planar surface of the side wall 23. The panel 22 has a top edge 4 and bottom edge 6 that are parallel with respect to each other. The top edge 4 and bottom edge 6 of the panel 22 longitudinally extend in a direction perpendicular to the ribs 16.

The panel 22 has a plurality of sub-panels 25. The sub-panels 25 are rectangular shaped and oriented so that the longer edge is parallel to the top edge 4 and the bottom edge 6. The surface of the sub-panel 25 is recessed below the surface of the body portion 21 and side wall 23. It should be understood that the surface of the sub-panel 25 may be co-planar with the surface of the body portions 21 or may be coplanar with the panel 22. The sub-panel 25 may alternatively extend further than the planar surface of the body portion 21. The sub-panels 25 provide additional structural support to the container 20 during the hot-fill process and prevent deformation of the side walls 3. This enables the container 20 to maintain a shape similar to its prior shape after the hot-fill process.

Figure 9:
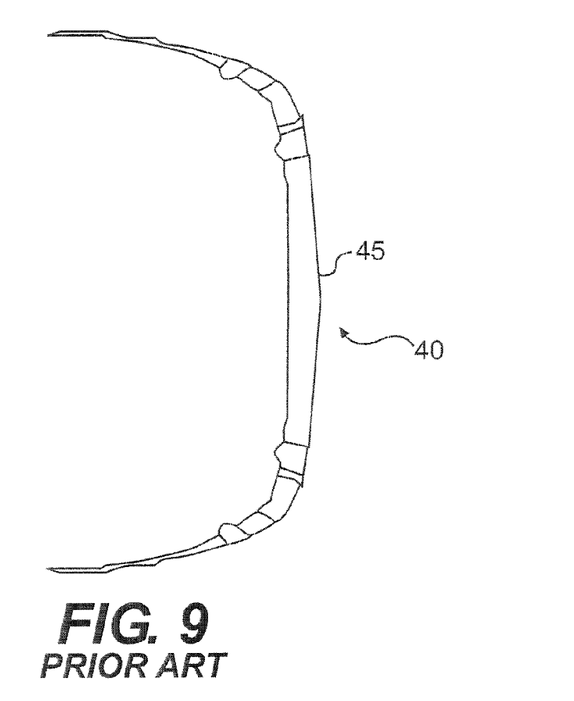
FIG. 9 shows a cross-sectional view of a standard container.

Now turning to FIGS. 9 and 10, cross-sectional views of a standard container and the container 10 are shown in order to illustrate the structural features of the side wall 5 and the panel 12. FIG. 9 shows a container 40 that has a side wall 45 that is uniformly planar. The cross-sectional view shown in FIG. 10 is taken along the line A-A shown in FIG. 1. This view illustrates how the surface of the panel 12 is gradually sloped towards the interior of the container 10 and is arcuate shaped. The curvature of the panel 12 provides structural support that prevents deformation of the container 10 and isolates the amount of deformation to certain areas of the container 10 during the hot-fill process. FIG. 10 also illustrates how the thickness of the panel 12 is reduced in comparison to the thickness of the side wall 5. This enables less material to be used in the construction of the container 10 while additionally retaining structural integrity during the hot-fill process. Although shown with less material, it is possible to construct the panel 12 with an equal amount of material, or with more material, without sacrificing the benefits of reducing deformation.

Figure 13:
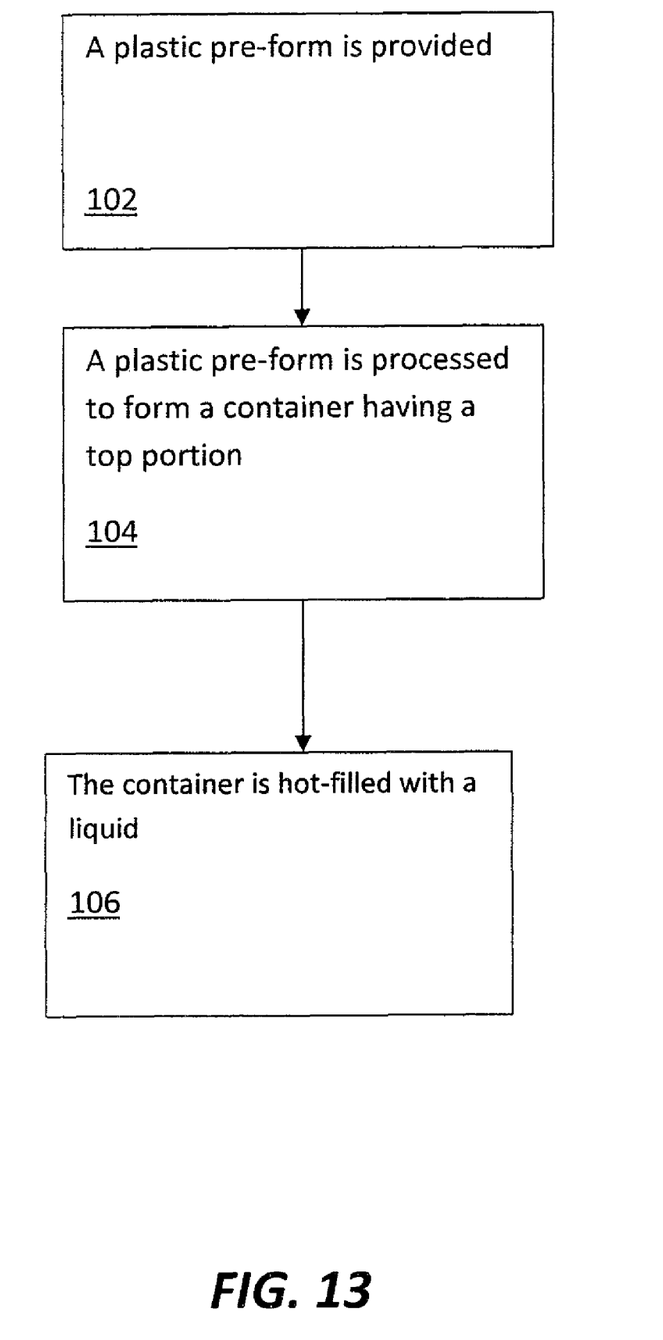
FIG. 13 is a flow chart of the method of hot-filling container.

FIG. 13 is a method of forming a hot-fill container 10 filled with a liquid. In step 102, a plastic pre-form is provided. In step 104, the plastic pre-form is processed to form a container having a top portion, a bottom portion and a body portion, wherein the body portion has a first planar wall and a second planar wall and the second planar wall is adapted to isolate deformation from hot-filling to the first wall. In step 106, the container is hot-filled with a liquid, wherein hot-filling the container 10 deforms the first planar wall and the second planar wall.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A hot-fillable container for use with liquids comprising:
   a top portion integrally formed with a body portion;
   the body portion comprising a first substantially planar wall and a second substantially planar wall, wherein the body portion is integrally formed with a bottom portion;
   wherein the first substantially planar wall comprises at least a first rib extending from a position proximate to the top portion to a position proximate to the bottom portion, the first substantially planar wall further comprising a plurality of second ribs formed therein;
   wherein the second substantially planar wall comprises at least a third rib extending from a position proximate to the top portion to a position proximate to the bottom portion, the second substantially planar wall further comprising an arcuate recessed portion formed therein; and
   wherein the recessed portion has a top edge and a bottom edge, wherein the top edge and the bottom edge are obliquely angled with respect to a center line of the recessed portion.

2. The hot-fillable container of claim 1, wherein the top edge of the recessed portion is v-shaped.

3. The hot-fillable container of claim 1, wherein the container is made of a PET material.

4. The hot-fillable container of claim 1, wherein the second substantially planar wall has a first thickness and the recessed portion has a second thickness that is different than said first thickness.

5. A method of forming a hot-fill container filled with a liquid comprising:
   providing a plastic pre-form;
   processing the plastic pre-form to form a container having a top portion, a bottom portion and a body portion, wherein said body portion has a first substantially planar wall comprising a first plurality of longitudinal ribs and a first arcuate recessed portion formed therein, and a second substantially planar wall comprising a second plurality of longitudinal ribs, wherein said second substantially planar wall is adapted to be substantially isolated from deformation from hot-filling; wherein the first arcuate recessed portion has a top edge and a bottom edge, wherein the top edge and the bottom edge are obliquely angled with respect to a center line of the recessed portion;
   hot-filling the container with a liquid, wherein hot-filling the container deforms said first substantially planar wall and said second substantially planar wall remains substantially non-deformed.

6. The method of claim 5, further comprising integrally forming the body portion with the top portion and the bottom portion.

7. The method of claim 6, wherein the second plurality of ribs extend from a position proximate to the top portion to a position proximate to the bottom portion.

8. The method of claim 7, wherein the second substantially planar wall has second arcuate recessed portion formed therein.

9. The method of claim 8, wherein the top edge of the recessed portion is v-shaped.

10. The method of claim 5, wherein the plastic container is made of a PET material.

\* \* \* \* \*